(12) United States Patent
Ohtsuka

(10) Patent No.: US 12,716,849 B2
(45) Date of Patent: Aug. 25, 2026

(54) INSPECTION APPARATUS, RECORDING MEDIUM, AND INSPECTION SYSTEM

(71) Applicant: Konica Minolta, Inc., Chiyoda-ku (JP)

(72) Inventor: Masaru Ohtsuka, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 100 days.

(21) Appl. No.: 18/536,014

(22) Filed: Dec. 11, 2023

(65) Prior Publication Data

US 2024/0192143 A1 Jun. 13, 2024

(30) Foreign Application Priority Data

Dec. 13, 2022 (JP) ................................. 2022-198311

(51) Int. Cl.
*G01N 21/896* (2006.01)
*G01N 21/88* (2006.01)

(52) U.S. Cl.
CPC ....... *G01N 21/896* (2013.01); *G01N 21/8851* (2013.01); *G01N 2021/8874* (2013.01); *G01N 2021/8887* (2013.01)

(58) Field of Classification Search
CPC ............. G01N 21/896; G01N 21/8851; G01N 2021/8874; G01N 2021/8887
See application file for complete search history.

(56) References Cited

U.S. PATENT DOCUMENTS

2009/0260738 A1* 10/2009 Kitada .................... B32B 38/04 156/64

FOREIGN PATENT DOCUMENTS

DE 102004005299 B4 * 9/2006 ............... G06T 5/77
JP H05-338039 A 12/1993
JP 2017-228877 A 12/2017

OTHER PUBLICATIONS

Notice of Reasons for Refusal dated May 19, 2026 issued in corresponding Japanese Patent Application No. 2022-198311, with English language machine translation thereof.

* cited by examiner

*Primary Examiner* — Jamil Ahmed
(74) *Attorney, Agent, or Firm* — SQUIRE PATTON BOGGS (US) LLP

(57) ABSTRACT

An inspection apparatus that is capable of inspecting a sheet includes a hardware processor. The hardware processor detects a defect in laminating processing in a sheet that has been laminated with a film by the laminating processing.

22 Claims, 8 Drawing Sheets

FIG. 1

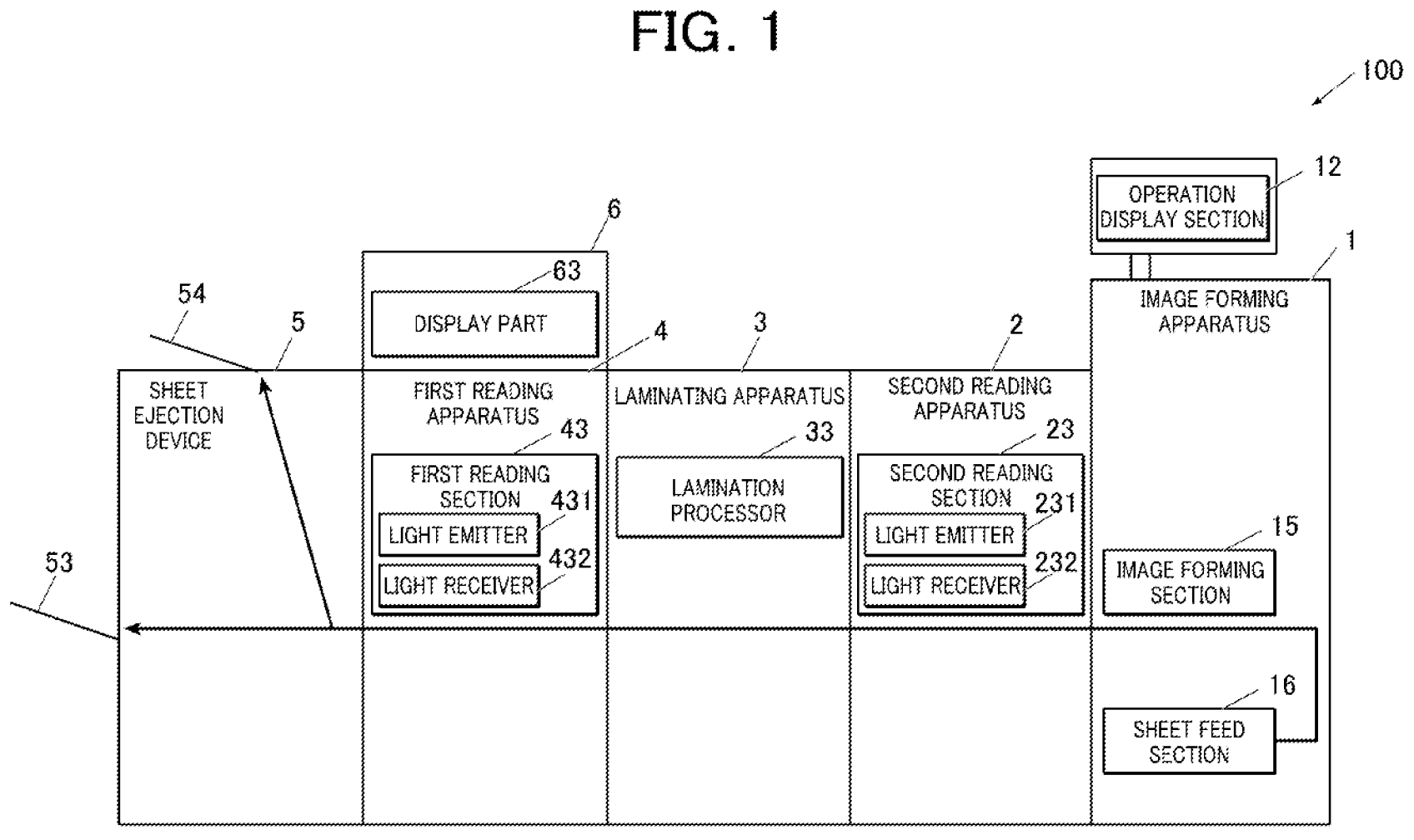

100
1 IMAGE FORMING APPARATUS
12 OPERATION DISPLAY SECTION
15 IMAGE FORMING SECTION
16 SHEET FEED SECTION
2 SECOND READING APPARATUS
23 SECOND READING SECTION
231 LIGHT EMITTER
232 LIGHT RECEIVER
3 LAMINATING APPARATUS
33 LAMINATION PROCESSOR
4 FIRST READING APPARATUS
43 FIRST READING SECTION
431 LIGHT EMITTER
432 LIGHT RECEIVER
6
63 DISPLAY PART
5 SHEET EJECTION DEVICE
54
53

100a
1
IMAGE FORMING APPARATUS
12
OPERATION DISPLAY SECTION
15
IMAGE FORMING SECTION
16
SHEET FEED SECTION
3
LAMINATING APPARATUS
33
LAMINATION PROCESSOR
4
FIRST READING APPARATUS
43
FIRST READING SECTION
431
LIGHT EMITTER
432
LIGHT RECEIVER
6
63
DISPLAY PART
5
SHEET EJECTION DEVICE
54
53

INSPECTION APPARATUS, RECORDING MEDIUM, AND INSPECTION SYSTEM

CROSS-REFERENCE TO RELATED APPLICATIONS

The entire disclosure of Japanese Patent Application No. 2022-198311 filed on Dec. 13, 2022 is incorporated herein by reference in its entirety.

BACKGROUND

Technical Field

The present invention relates to an inspection apparatus, a recording medium, and an inspection system.

Description of Related Art

In the related art, a technology of performing a laminating processing of pressure-bonding a laminate film to a recording medium (sheet) on which an image is formed by an image forming apparatus is known (for example, Japanese Unexamined Patent Publication No. H5-338039).

SUMMARY

In the laminating processing, defects such as wrinkles, flaws, and air bubbles may occur in the laminate film pressure-bonded to the sheet. Regarding such a defect, in the related art, since a user visually determines whether or not a defect occurs, a lot of work time and labor are required for the inspection processing in the laminating processing.

An object of the present invention is to provide an inspection apparatus, a recording medium, and an inspection system that can reduce the operation time and effort of inspection processing in laminating processing.

To achieve at least one of the abovementioned objects, according to an aspect of the present invention, an inspection apparatus capable of inspecting a sheet reflecting one aspect of the present invention includes:

a hardware processor that detects a defect in laminating processing in a sheet that has been laminated with a film by the laminating processing.

To achieve at least one of the abovementioned objects, a non-transitory recording medium according to an aspect of the present invention stores a computer-readable program causing a computer of an inspection apparatus that is capable of inspecting a sheet to function as:

a hardware processor that detects a defect in laminating processing in a sheet that has been laminated with a film by the laminating processing.

To achieve at least one of the abovementioned objects, according to an aspect of the present invention, an inspection system capable of inspecting a sheet reflecting one aspect of the present invention includes:

a lamination processor that performs laminating processing in which a sheet is laminated with a film; and a hardware processor that detects a defect in the laminating processing in the sheet that has been subjected to the lamination processing by the lamination processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 1 is a diagram illustrating a schematic configuration of an inspection system according to a first embodiment:

DETAILED DESCRIPTION

Hereinafter, embodiments of the present invention will be described in detail with reference to the drawings. However, the scope of the invention is not limited to the illustrated examples.

First Embodiment (1. Configuration of Inspection System 100)

Figure 2:
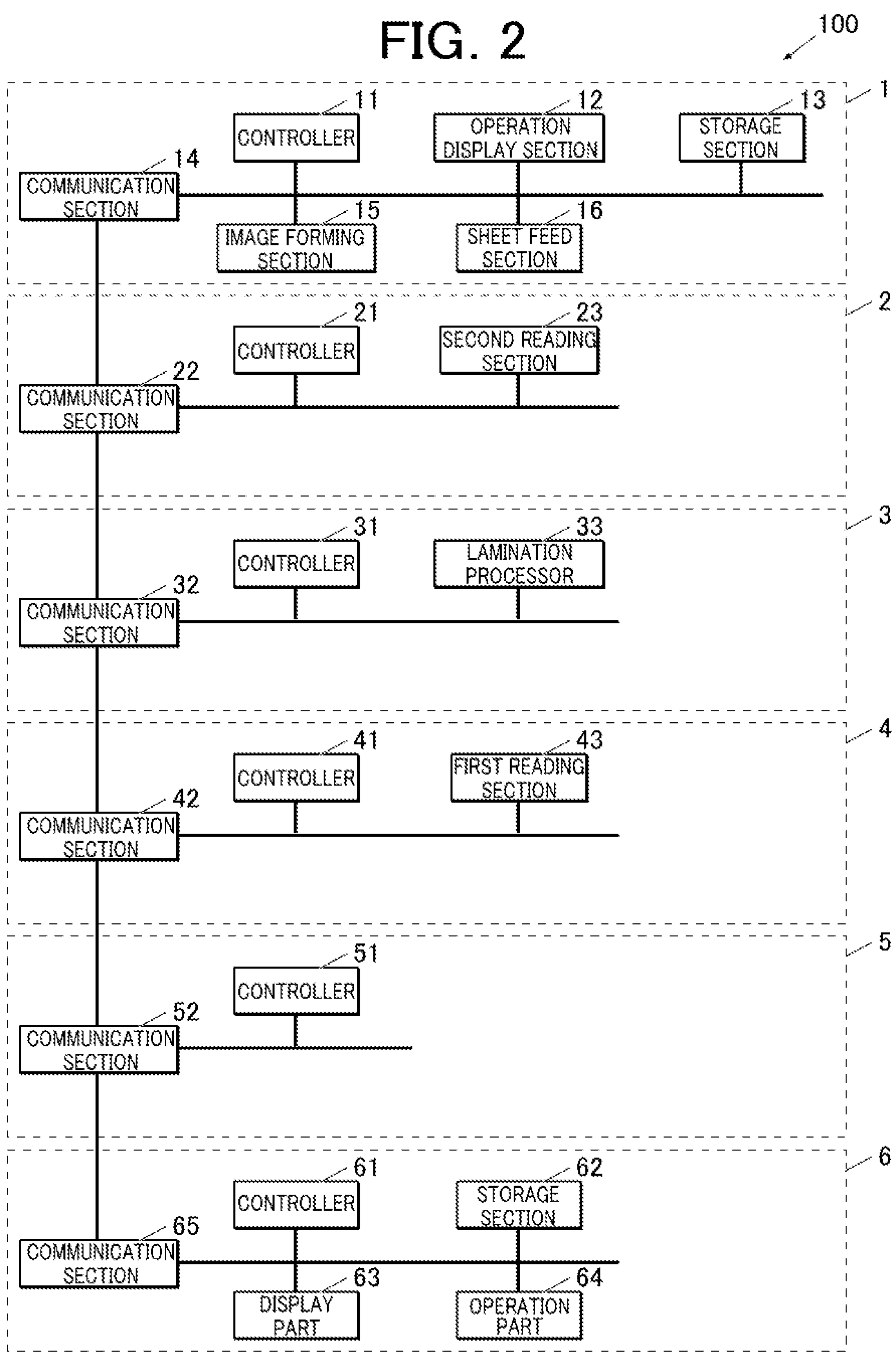
FIG. 2 is a block diagram illustrating a functional configuration of the inspection system according to the first embodiment.

Structure of a first embodiment is described below. FIG. 1 is a diagram illustrating a schematic configuration of an inspection system 100 according to the present embodiment. FIG. 2 is a block diagram illustrating a functional configuration of the inspection system 100. As illustrated in FIGS. 1 and 2, the inspection system 100 includes an image forming apparatus 1, a second reading apparatus 2, a laminating apparatus 3, a first reading apparatus 4, a sheet ejection device 5, and an inspection apparatus 6. In the inspection system 100, the image forming apparatus 1, the second reading apparatus 2, the laminating apparatus 3, a first reading apparatus 4, and the sheet ejection device 5 are arranged in this order from an upstream side in a sheet conveyance direction.

(1-1. Configuration of Image Forming Apparatus 1)

The image forming apparatus 1 forms an image on a sheet based on input image data. As shown in FIG. 2, the image forming apparatus 1 includes a controller 11, an operation display section 12, a storage section 13, a communication section 14, an image forming section (image former) 15, and a sheet feed section 16.

The controller 11 includes a central processing unit (CPU), a read only memory (ROM), and a random access memory (RAM). The CPU of the controller 11 reads a program stored in the ROM, develops the program in the RAM, and integrally controls each section of the image forming apparatus 1 according to the developed program.

For example, when a print job (hereinafter referred to as a job) is input from an external apparatus such as a personal computer (PC) via the communication section 14, the controller 11 causes the image forming section 15 to form an image on a sheet on the basis of the received information. Next, the controller 11 conveys the sheet having the image formed thereon to the second reading apparatus 2 by a conveyance roller or the like (not shown).

The operation display section 12 includes an operation part and a display part. The operation part includes an input device such as an operation key or a touch screen disposed so as to be superimposed on a screen of the display part. The operation part converts an input operation on these input devices into an operation signal and outputs the operation signal to the controller 11. The display part includes a liquid crystal display (LCD) or the like, and displays an operation screen or the like which illustrates a state of each device of the inspection system 100, content of an input operation to the touch screen, and the like.

The storage section 13 includes a dynamic random access memory (DRAM), a hard disc drive (HDD), and the like. The storage section 13 stores image data of a job which is externally input, setting information of the job, and the like. The setting information of the job includes information about post-processing to be executed in the job, in addition to image forming conditions such as a kind of a sheet, a sheet size, and single-sided/double-sided printing to be used in the job. The information related to post-processing executed in the job is, for example, information related to laminating processing.

The communication section 14 includes a network interface card (NIC), a serial interface, or the like. The communication section 14 transmits and receives data to and from an external PC, another apparatus of the inspection system 100, and the like.

The image forming section 15 forms an image on a sheet based on the image data of the job stored in the storage section 13 according to the control of the controller 11. An image forming method of the image forming section 15 includes various methods such as an electrophotographic method and an inkjet method.

The sheet feed section 16 includes a sheet feed tray in which sheets are stored, and feeds a sheet in accordance with control from the controller 11.

(1-2. Configuration of Second Reading Apparatus 2)

The second reading apparatus 2 is connected to the downstream side of the image forming apparatus 1 in the sheet conveyance direction. The second reading apparatus 2 reads the image-formed sheet conveyed from the image forming apparatus 1 and transmits a second read image which is an obtained read image to the inspection apparatus 6. As shown in FIG. 2, the second reading apparatus 2 includes a controller 21, a communication section 22, a second reading section (a second reader) 23, and the like.

The controller 21 includes a CPU, a ROM, and a RAM. The CPU of the controller 21 reads a program stored in the ROM, develops the program in the RAM, and integrally controls each section of the second reading apparatus 2 according to the developed program. For example, the controller 21 causes the second reading section 23 to read an image-formed sheet conveyed from the image forming apparatus 1. Next, the controller 21 transmits the obtained data of the second read image to the inspection apparatus 6 via the communication section 22. Next, the controller 21 conveys the read sheet to the laminating apparatus 3 by a conveyance roller or the like (not shown).

The communication section 22 includes an NIC, a serial interface, or the like, and transmits and receives data to and from other devices of the inspection system 100.

The second reading section 23 reads an upper surface of the sheet conveyed from the image forming apparatus 1. The upper surface of the sheet is a surface of the sheet on which an image is formed. The second reading section 23 includes a light emitter 231 and a light receiver 232. The light emitter 231 emits light so that the light obliquely strikes the upper surface of the sheet conveyed from the image forming apparatus 1. The light receiver 232 includes, for example, a charge coupled device (CCD) line sensor, and receives and detects reflected light from the sheet, which is light in a direction oblique to the upper surface of the sheet.

Next, the second reading section 23 outputs the generated second read image as a reading result to the controller 21. A readable range of the second reading section 23 is larger than a sheet size.

(1-3. Configuration of Laminating Apparatus 3)

The laminating apparatus 3 is connected to the downstream side of the second reading apparatus 2 in the sheet conveyance direction. That is, the second reading apparatus 2 is connected to the upstream side of the laminating apparatus 3 in the sheet conveyance direction. The laminating apparatus 3 performs laminating processing on the sheet conveyed from the second reading apparatus 2. As shown in FIG. 2, the laminating apparatus 3 includes a controller 31, a communication section 32, a lamination processor 33, and the like.

The controller 31 includes a CPU, a ROM, and a RAM. The CPU of the controller 31 reads a program stored in the ROM, develops the program in the RAM, and generally controls each unit of the laminating apparatus 3 according to the developed program. For example, the controller 31 receives information relating to the laminating processing from the image forming apparatus 1 via the communication section 32. Next, based on the received information, the controller 31 causes the lamination processor 33 to perform laminating processing on the sheet conveyed from the second reading apparatus 2. Next, the controller 31 conveys the sheet subjected to the laminating processing to the first reading apparatus 4 by a conveyance roller or the like (not illustrated).

The communication section 32 includes a NIC, a serial interface, or the like, and transmits and receives data to and from other devices of the inspection system 100.

The lamination processor 33 performs laminating processing by superimposing a laminate film on the upper side of the sheet conveyed from the second reading apparatus 2. The upper surface of the sheet is a surface of the sheet on which an image is formed.

(1-4. Configuration of First Reading Apparatus 4)

The first reading apparatus 4 is connected to the downstream side of the laminating apparatus 3 in the sheet conveyance direction. The first reading apparatus 4 reads the sheet having undergone the laminating processing, which has been transported from the laminating apparatus 3, and transmits a first read image, which is the obtained read image, to the inspection apparatus 6. As illustrated in FIG. 2, the first reading apparatus 4 includes a controller 41, a communication section 42, and a first reading section (first reader) 43.

The controller 41 includes a CPU, a ROM, and a RAM. The CPU of the controller 41 reads a program stored in the ROM, develops the program in the RAM, and integrally controls each unit of the first reading apparatus 4 according to the developed program. For example, the controller 41 causes the first reading section 43 to read the sheet having undergone the laminating processing transported from the laminating apparatus 3. Next, the controller 41 transmits the obtained data of the first read image to the inspection apparatus 6 via the communication section 42. Next, the controller 41 conveys the read sheet to the sheet ejection device 5 by a conveyance roller or the like (not shown).

The communication section 42 includes an NIC, a serial interface, or the like, and transmits and receives data to and from other devices of the inspection system 100.

The first reading section 43 reads the upper surface of the sheet conveyed from the laminating apparatus 3. The upper surface of the sheet is a surface of the sheet on which an image is formed, and which is subjected to the laminating processing. The first reading section 43 includes a light emitter 431 and a light receiver 432. The light emitter 431 emits light so as to be applied obliquely to the upper surface of the sheet conveyed from the laminating apparatus 3. The light receiver 432 includes, for example, a CCD line sensor, and receives and detects reflected light from the sheet, which is light in a direction oblique to the upper surface of the sheet. Thus, in a case where a defect such as a wrinkle, a scratch, or an air bubble has occurred in the laminate film of the sheet having undergone the laminating processing, the first reading section 43 can read the defect with accuracy.

Next, the first reading section 43 outputs the generated first read image as a reading result to the controller 41. The first read image is information corresponding to a surface state of a sheet subjected to the laminating processing. A readable range of the first reading section 43 is larger than a sheet size.

(1-5. Configuration of Sheet Ejection Device 5)

As illustrated in FIGS. 1 and 2, the sheet ejection device 5 includes a controller 51, a communication section 52, a first tray 53, a second tray 54, and a conveyance roller (not illustrated).

The controller 51 of the sheet ejection device 5 ejects the sheet conveyed from the first reading apparatus 4 to the first tray 53 or the second tray 54 under the control of a controller 61 which will be described later. For example, when a sheet conveyed from the first reading apparatus 4 is a non-defective product, the controller 51 ejects the sheet as an output product to the first tray 53. When a defect has occurred in a sheet conveyed from the first reading apparatus 4, the controller 51 ejects the sheet as waste sheet to the second tray 54.

The communication section 52 includes an NIC, a serial interface, or the like, and transmits and receives data to and from other devices of the inspection system 100.

(1-6. Configuration of Inspection Apparatus 6)

The inspection apparatus 6 is a computer device such as a PC, and inspects a sheet on which an image has been formed by the image forming apparatus 1 and which has been laminated by the laminating apparatus 3. As shown in FIG. 2, the inspection apparatus 6 includes a controller 61, a storage section 62, a display part 63, an operation part 64, a communication section 65, and the like.

The controller 61 includes a CPU, a ROM, and a RAM. The CPU of the controller 61 reads a program stored in the ROM, develops the program in the RAM, and integrally controls each unit of the inspection apparatus 6 in accordance with the developed program. For example, when the image forming apparatus 1 receives a job including laminating processing, the controller 61 performs inspection control processing, which will be described later.

The storage section 62 is formed with a DRAM, an HDD, or the like, and stores various kinds of data. The storage section 62 stores data of a pattern image used for the inspection control processing. The pattern image includes a pattern image related to an image formation defect and a pattern image related to a lamination process defect. The pattern image related to the image formation defect is, for example, an image in which toner adhesion, a white spot, or the like occurs. The pattern image relating to the laminating processing defect is, for example, an image in which wrinkles, scratches, air bubbles, or the like are generated in the laminate film.

The display part 63 includes a monitor such as an LCD, and displays various screens according to an instruction of a display signal input from the controller 61.

The operation part 64 includes a keyboard having cursor keys, character/numeral input keys, various function keys, and the like, and a pointing device such as a mouse. The operation part 64 outputs an operation signal input by a key operation on the keyboard, a mouse operation, or the like to the controller 61.

The communication section 65 includes an NIC, a serial interface, or the like, and transmits and receives data to and from other devices of the inspection system 100.

(2. Operation of Inspection System 100)

Figure 3:
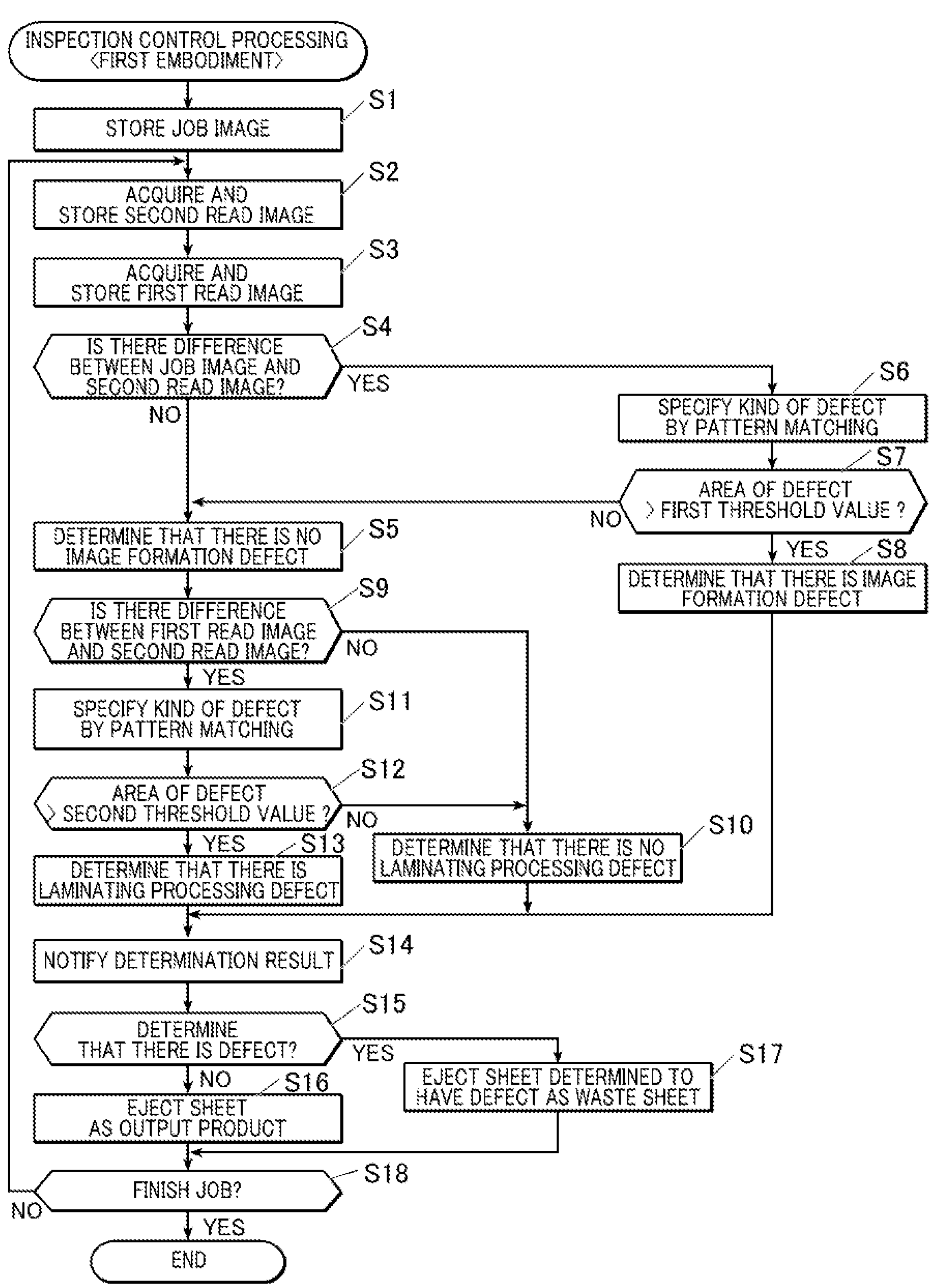
FIG. 3 is a flowchart illustrating a flow of inspection control processing according to the first embodiment.

Next, an operation of the inspection system 100 will be described. FIG. 3 is a flowchart illustrating a flow of inspection control processing. When the image forming apparatus 1 receives the setting information including the image data of the job and the information about the laminating processing via the communication section 14, the controller 61 of the inspection apparatus 6 executes the inspection control processing. The CPU of the controller 61 executes the inspection control processing of FIG. 3 in cooperation with a program stored in the ROM.

By executing the inspection control processing, the controller 61 can detect a defect in the laminating processing on a sheet on which a laminate film is laminated. The controller 61 functions as a detecting section.

The controller 61 receives the image data (original image data) of the job from the image forming apparatus 1, and stores it in the storage section 62 (step S1).

Next, in the image forming apparatus 1, the controller 11 causes the sheet feed section 16 to convey a sheet, and causes the image forming section 15 to form an image on the sheet based on the image data of the job.

In the second reading apparatus 2, the controller 21 causes the second reading section 23 to read the image-formed surface of the sheet on which an image has been formed by the image forming section 15. Next, the controller 21 transmits the data of the second read image to the inspection apparatus 6.

Next, the controller 61 acquires data of the second read image from the second reading apparatus 2 and stores the data in the storage section 62 (step S2).

Next, in the laminating apparatus 3, the controller 31 causes the lamination processor 33 to perform laminating processing on the side of the sheet with the image formed thereon.

In the first reading apparatus 4, the controller 41 causes the first reading section 43 to read the laminated surface of the sheet that has been laminated by the laminating apparatus 3. Next, the controller 41 transmits the data of the first read image to the inspection apparatus 6.

Next, the controller 61 acquires data of the first read image from the first reading apparatus 4 and stores the data in the storage section 62 (step S3).

Next, the controller 61 determines whether or not there is a difference between the original image data saved in step S1 and the data of the second read image saved in step S2 (step S4).

When there is no difference between the original image data and the data of the second read image (step S4; NO), the controller 61 determines that "no defect has occurred in formation of an image on a sheet (no image formation defect)" (step S5).

On the other hand, when there is a difference between the original image data and the data of the second read image (step S4: YES), the controller 61 subtracts the original image data from the data of the second read image to generate first difference image data. Next, the controller 61 compares the first difference image with the pattern image relating to the image formation defect stored in the storage section 62 to perform pattern matching. Next, the controller 61 determines, from the result of the pattern matching, whether or not the kind of defect that is the difference in the first difference image is at least one of toner adhesion and a white spot (step S6).

Figure 4A:
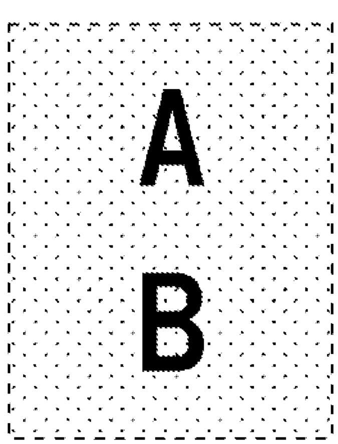
FIG. 4A is a diagram showing an example of an original image.
Figure 4B:
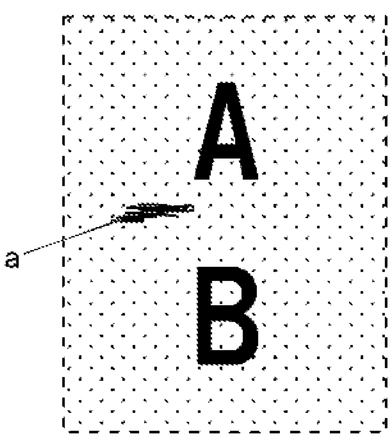
FIG. 4B is a diagram illustrating an example of a second read image.

FIG. 4A illustrates an example of an original image. FIG. 4B illustrates an example of the second read image. In the example illustrated in FIG. 4B, a stain a due to toner adhesion, which is an image formation defect, has occurred in the second read image.

Figure 4C:
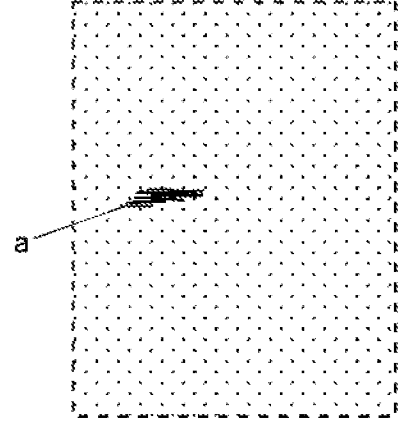
FIG. 4C is a diagram showing an example of a first difference image.

FIG. 4C illustrates an example of a first difference image. The controller 61 determines in step S6 that the kind of defect in the first difference image illustrated in FIG. 4C is toner adhesion.

Next, the controller 61 determines whether or not the area of the defect in the first difference image is larger than a first threshold value corresponding to the kind of defect specified in step S6 (step S7). The first threshold value is set in advance for each kind of image formation defect (toner adhesion, white spot, etc).

When the area of the defect in the first difference image is larger than the first threshold value (step S7; YES), the controller 61 determines that "a defect has occurred in formation of an image on a sheet (there is an image formation defect)" (step S8).

Next, the controller 61 shifts the processing to step S14. That is, when the controller 61 detects a defect in image formation on a sheet based on the second read image, the controller 61 does not perform defect detection in the laminating processing.

On the other hand, when the defective area in the first difference image is equal to or smaller than the first threshold value (step S7: NO), the controller 61 allows the process to proceed to step S5.

Subsequent to step S5, the controller 61 determines whether or not there is a difference between the data of the second read image and the data of the first read image stored in step S3 (step S9).

When there is no difference between the data of the second read image and the data of the first read image (step S9; NO), the controller 61 determines that "no defect has occurred in performing laminating processing on a sheet (no laminating processing defect)" (step S10).

On the other hand, when there is a difference between the data of the second read image and the data of the first read image (step S9: YES), the controller 61 subtracts the data of the second read image from the data of the first read image to generate second difference image data. Next, the controller 61 performs pattern matching by comparing the second difference image with the pattern image relating to the laminating processing defect stored in the storage section 62. Next, the controller 61 specifies whether or not the kind of the defect which is the difference in the second difference image is at least one of a wrinkle, a flaw, or an air bubble in the laminate film from the result of the pattern matching (step S11).

Figure 4D:
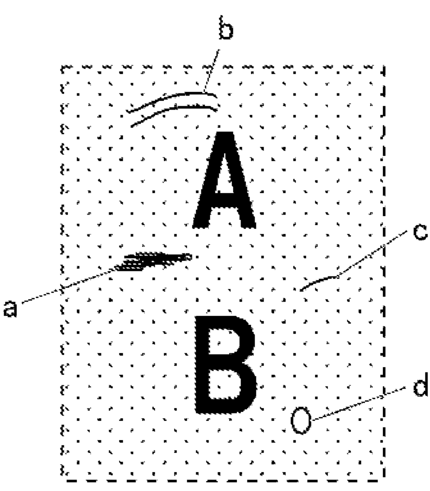
FIG. 4D is a diagram illustrating an example of a first read image.

FIG. 4D illustrates an example of a first read image. In the example shown in FIG. 4D, in the first read image, wrinkles b, scratches c, and air bubbles d in the laminate film, which are laminating processing defects, are generated.

Figure 4E:
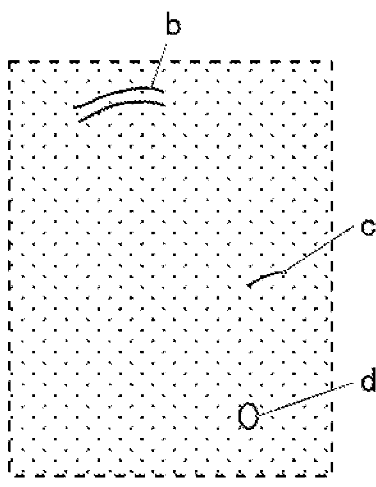
FIG. 4E is a diagram illustrating an example of a second difference image.

FIG. 4E illustrates an example of the second difference image. In step S11, the controller 61 specifies that the kinds of defects in the second difference image shown in FIG. 4E are wrinkles, scratches, and air bubbles in the laminate film.

Next, the controller 61 determines whether or not the area of the defect in the second difference image is larger than a second threshold value corresponding to the kind of defect specified in step S11 (step S12). The second threshold value is set in advance for each kind of laminating processing defect (wrinkles, scratches, air bubbles, and the like in the laminate film).

If the area of the defect in the second difference image is larger than the second threshold value (step S12; YES), the controller 61 determines that "a defect has occurred in performing laminating processing on a sheet (there is a laminating processing defect)" (step S13). That is, the controller 61 detects the defect in the laminating processing based on the shape (pattern image) and the size (second threshold value) registered in advance with respect to at least one of the wrinkle, the flaw, and the air bubble of the laminate film.

On the other hand, when the defective area in the second difference image is equal to or smaller than the second threshold value (step S12; NO), the controller 61 allows the process to proceed to step S10.

After step S8, S10, or S13, the controller 61 notifies the user of the determination results in steps S5, S8, S10, or S13 by displaying them on the display part 63 (step S14). That is, the controller 61 notifies the user of the determination result obtained by the detecting section. The controller 61 functions as a notification unit.

Next, the controller 61 determines whether or not it has been determined that there is an image formation defect in step S8 or there is a lamination process defect in step S13 (step S15).

In a case where there is no image formation defect and there is no lamination process defect (step S15: NO), the controller 61 controls the sheet ejection device 5 to eject the sheet determined to have no defect to the first tray 53 as an output product which is a non-defective product (step S16).

On the other hand, when the controller 61 determines that at least one of an image formation defect and a laminating processing defect has occurred (step S15: YES), the controller 61 ejects, as a waste sheet, the sheet determined as having a defect to the second tray 54 (step S17). Thus, it is easy to distinguish a waste sheet from which a defect has been detected from an output product (non-defective product).

Next, the controller 61 determines whether or not the inspection processing (steps S2 to S16 or S2 to S17) for all the pages of the job received by the image forming apparatus 1 is completed (step S18).

If the inspection processing has been finished on all the pages of the job (YES in step S18), the controller 61 finishes this processing.

On the other hand, when there is a page for which the inspection processing is not performed in the job (step S18: NO), the controller 61 allows the process to proceed to step S2.

Second Embodiment

Hereinafter, a second embodiment of the present invention will be described.

(3. Configuration of Inspection System 100*a*)

Figure 5:
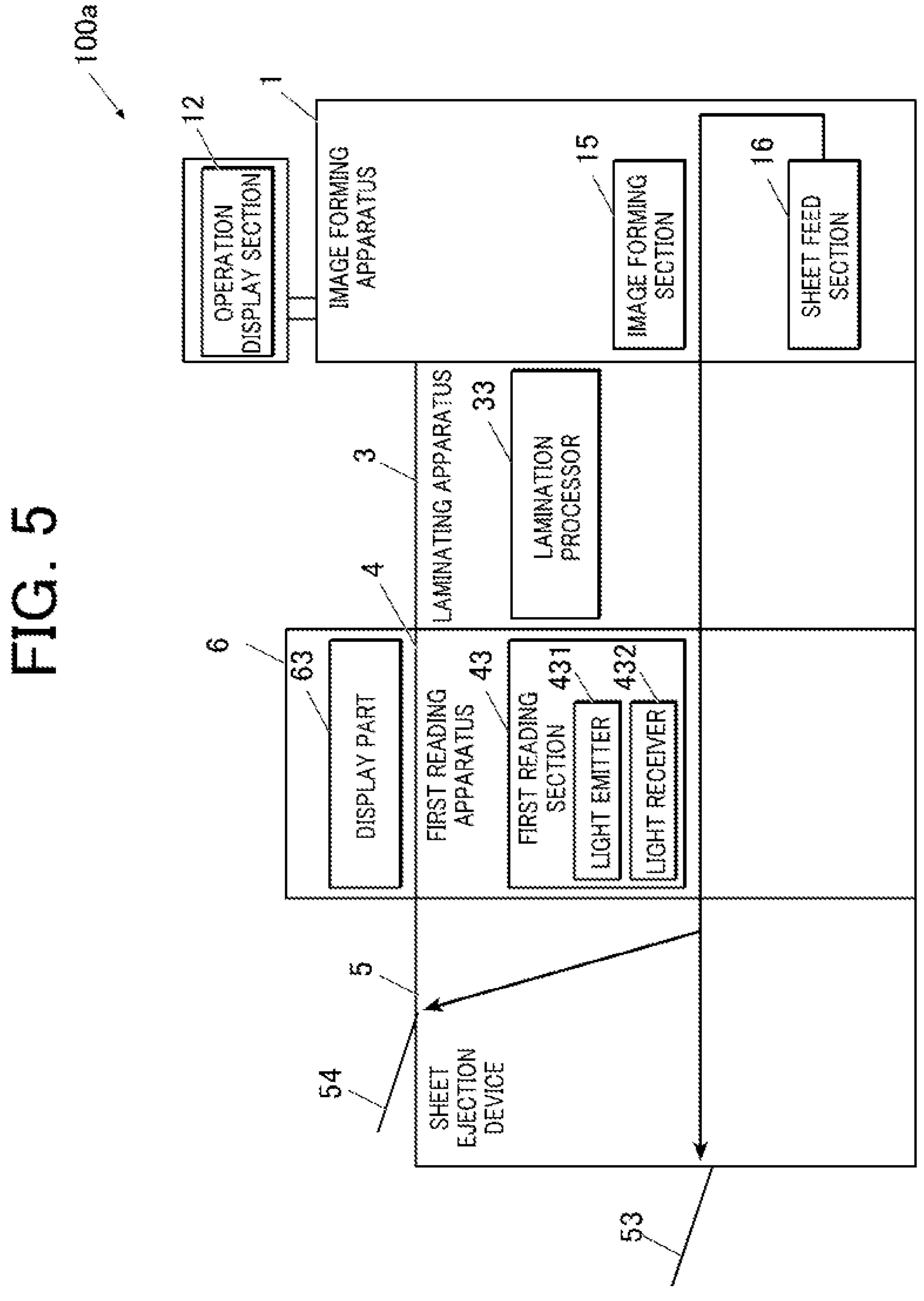
FIG. 5 is a view showing the schematic configuration of an inspection system according to a second embodiment.
Figure 6:
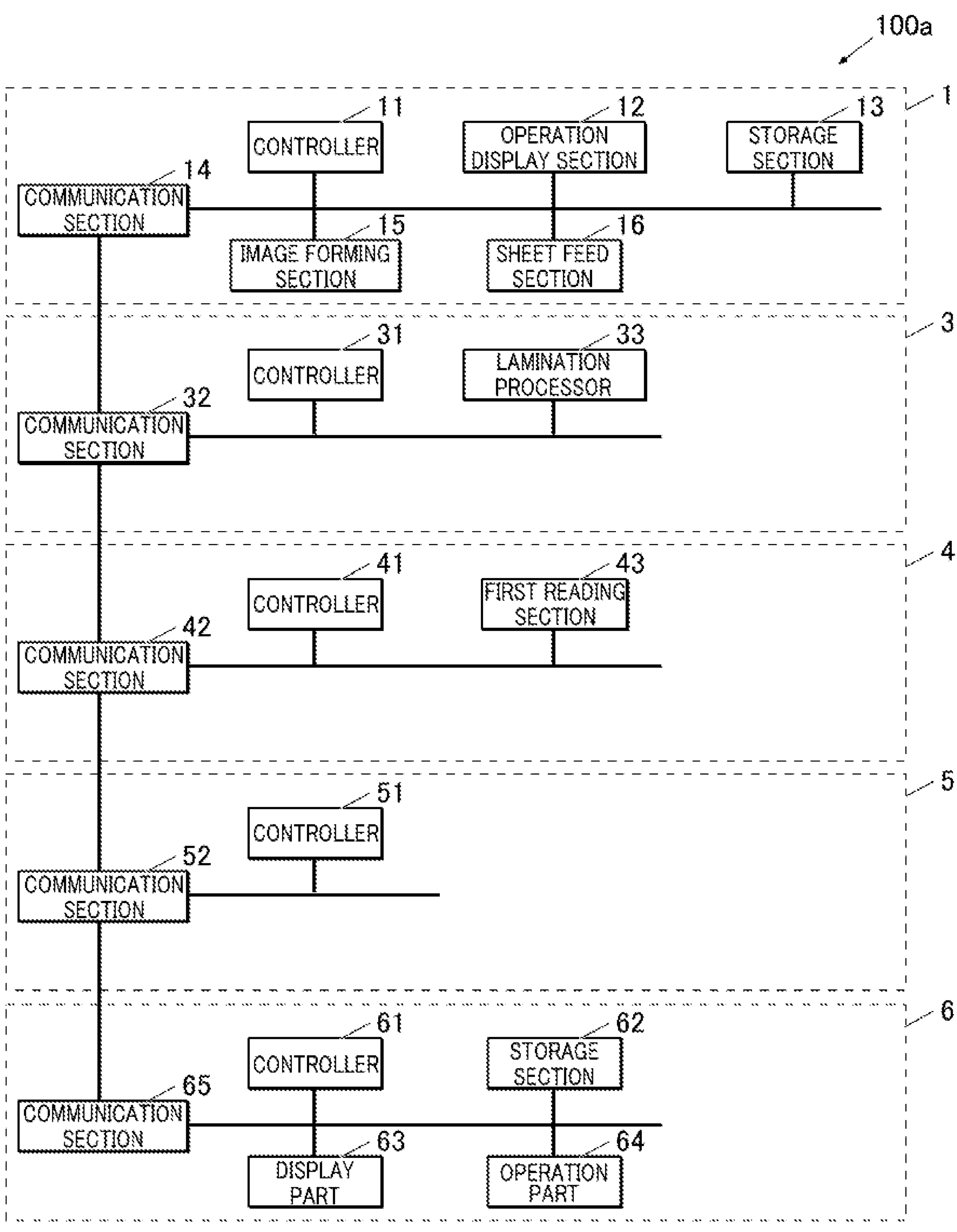
FIG. 6 is a block diagram illustrating a functional configuration of an inspection system according to the second embodiment.

A structure of a second embodiment is described below. FIG. 5 is a diagram illustrating a schematic configuration of the inspection system 100*a* according to the present embodiment. FIG. 6 is a block diagram illustrating a functional configuration of the inspection system 100*a*. As illustrated in FIGS. 5 and 6, the inspection system 100*a* includes an image forming apparatus 1, a laminating apparatus 3, a first reading apparatus 4, a sheet ejection device 5, and an inspection apparatus 6.

The configuration of each device included in the inspection system 100*a* is the same as that of the first embodiment. In the present embodiment, the laminating apparatus 3 is connected to the downstream side of the image forming apparatus 1 in the sheet conveyance direction.

(4. Operation of Inspection System 100*a*)

Figure 7:
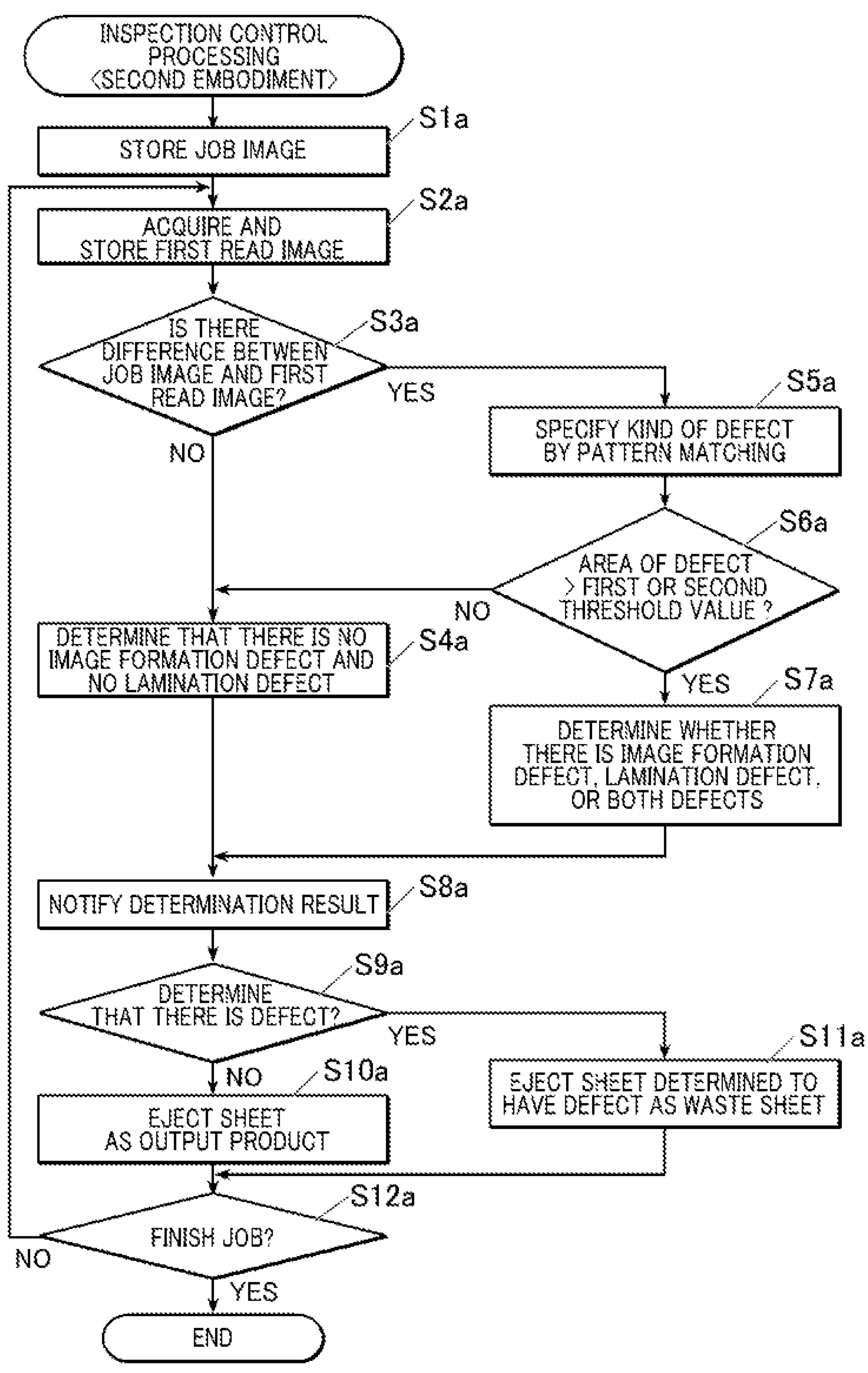
FIG. 7 is a flowchart illustrating a flow of inspection control processing according to the second embodiment.

Next, operation of the inspection system 100*a* will be described. FIG. 7 is a flowchart illustrating a flow of inspection control processing. When the image forming apparatus 1 receives the setting information including the image data of the job and the information about the laminating processing via the communication section 14, the controller 61 of the inspection apparatus 6 executes the inspection control processing. The CPU of the controller 61 executes the inspection control processing of FIG. 7 in cooperation with the program stored in the ROM.

The controller 61 performs step S1*a* similar to the inspection control processing step S1 according to the first embodiment.

Next, in the image forming apparatus 1, as in the first embodiment, the controller 11 causes the sheet feed section 16 to convey a sheet and causes the image forming section 15 to form an image on the sheet based on the image data of the job. Next, in the laminating apparatus 3, as in the first embodiment, the controller 31 causes the lamination processor 33 to perform the laminating processing on the surface of the sheet on which the image has been formed.

In the first reading apparatus 4, similarly to the first embodiment, the controller 41 causes the first reading section 43 to read the laminated surface of the sheet that has been laminated by the laminating apparatus 3. Next, the controller 41 transmits the data of the first read image to the inspection apparatus 6.

Next, the controller 61 performs step S2*a* similar to the inspection control processing step S3 according to the first embodiment.

Next, the controller 61 determines whether or not there is a difference between the original image data saved in step S1*a* and the data of the first read image saved in step S2*a* (step S3*a*).

In a case where there is no difference between the original image and the first read image (Step S3*a*: NO), the controller 61 determines that "a defect does not occur when an image is formed on a sheet (no image formation defect) and a defect does not occur when laminating processing is performed on a sheet (no laminating processing defect)" (Step S4*a*).

On the other hand, when there is a difference between the original image data and the data of the first read image (step S3*a*: YES), the controller 61 subtracts the original image data from the data of the first read image to generate third difference image data. Next, the controller 61 performs pattern matching by comparing the third difference image with the pattern image concerning the image formation defect and the pattern image concerning the laminating processing defect stored in the storage section 62. Next, from the result of the pattern matching, the controller 61 specifies whether or not the kind of defect, which is a difference in the third difference image, is at least one of toner adhesion, a white spot, a wrinkle in the laminate film, a flaw, and an air bubble (step S5*a*).

Figure 8:
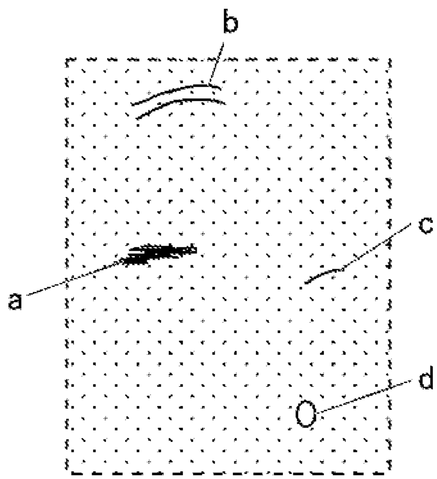
FIG. 8 is a diagram illustrating an example of a third difference image.

FIG. 8 illustrates an example of the third difference image. In step S5*a*, the controller 61 specifies that the kinds of defects in the third difference image shown in FIG. 8 are toner adhesion, and wrinkling, scratches, and air bubbles in the laminate film.

Next, the controller 61 determines whether or not the area of the defect in the third difference image is larger than the first threshold value or the second threshold value corresponding to the kind of defect specified in step S5*a* (step S6*a*).

If the area of the defect in the third difference image is larger than the first threshold or the second threshold (YES in step S6*a*), the controller 61 determines whether "a defect has occurred in forming an image on a sheet (there is an image formation defect)", "a defect has occurred in performing laminating processing on a sheet (there is a lamination process defect)", or "both of an image formation defect and a lamination process defect have occurred" (step S7*a*). As for the example illustrated in FIG. 8, the controller 61 determines in step Sa that both an image formation defect and a laminating processing defect have occurred.

After step S4*a* or S7*a*, the controller 61 notifies the user of the determination result in step S4*a* or S7*a* by displaying it on the display part 63 (step S8*a*).

Next, the controller 61 performs steps S9*a* to S12*a* similar to the inspection control processing steps S15 to S18 of the first embodiment, and ends the present processing.

(5. Effects)

As described above, the inspection apparatus 6 according to the present embodiment is an inspection apparatus capable of inspecting a sheet. The inspection apparatus 6 according to the present embodiment includes a detecting section (controller 61) configured to detect a defect in a laminating processing performed on a sheet on which a laminate film is laminated. Therefore, the inspection processing in the laminating processing can be automatically performed by the detecting section. Thus, a user does not need to perform visual inspection, and it is possible to reduce the operation time and effort required for the inspection processing in the laminating processing.

In the inspection apparatus 6 according to the present embodiment, the detecting section acquires information corresponding to the surface state of the sheet subjected to the laminating processing, and detects a defect in the laminating processing based on the acquired information. Therefore, the inspection processing in the laminating processing can be automatically performed based on the information corresponding to the surface state of the sheet subjected to the laminating processing.

In the inspection apparatus 6 according to the present embodiment, the detecting section acquires the first read image from the first reading section that reads an image of a laminated sheet, and detects a lamination defect based on the first read image. Therefore, the inspection processing in the laminating processing can be automatically performed based on the first read image.

In the present embodiment, the detecting section acquires the first read image from the first reading section 43 arranged on the downstream side in the sheet conveyance direction of the lamination processor 33 that performs the laminating processing.

In the inspection apparatus 6 according to the present embodiment, the first reading section 43 can be connected to the downstream side of the lamination processor 33 in the sheet conveyance direction. Accordingly, the detecting section can automatically acquire the image of the sheet subjected to the laminating processing.

In the present embodiment, the lamination processor 33 is disposed at a downstream side in the sheet conveyance direction of the image forming section 15 that is capable of forming an image on a sheet. The detecting section detects a defect in laminating processing performed on a sheet after image formation.

In the present embodiment, the lamination processor 33 can be connected to the downstream side of the image forming section 15 in the sheet conveyance direction. Therefore, it is possible to automatically perform the inspection processing in the laminating processing for the sheet after the image formation.

In the inspection apparatus 6 according to the present embodiment, the detecting section detects at least one of a wrinkle, a flaw, and an air bubble of the laminated film as a defect in the laminating processing. Therefore, it is possible to automatically detect a wrinkle, a flaw, and an air bubble of the laminated film as a defect in the laminating processing.

In the inspection apparatus 6 of the present embodiment, the detecting section detects a defect in the laminating processing based on the shape (pattern image) and the size (second threshold value) registered in advance for at least one of a wrinkle, a flaw, and an air bubble of the laminate film. Therefore, it is possible to appropriately detect the defect in the laminating processing based on the shape (pattern image) and the size (second threshold value) registered in advance.

In the inspection apparatus 6 according to the present embodiment, the detecting section detects a defect in the laminating processing based on the original image (image of the job) formed on the sheet before the laminating processing and the first read image. Therefore, it is possible to appropriately detect the defect in the laminating processing based on the original image (image of the job) and the first read image.

In the inspection apparatus 6 according to the present embodiment, the detecting section detects a laminating processing defect by subtracting the original image from the first read image. Therefore, a defect in the laminating processing can be easily detected by subtracting the original image from the first read image.

In the inspection apparatus 6 according to the present embodiment, the detecting section acquires the second read image from the second reading section 23 that reads the image of the sheet before the laminating processing. The detecting section detects a defect in the laminating processing on the basis of the first read image and the second read image. Accordingly, it is possible to appropriately detect a defect in the laminating processing based on the first read image and the second read image.

In the inspection apparatus 6 according to the present embodiment, the detecting section acquires the second read image from the second reading section 23 that can be connected to the upstream side in the sheet conveyance direction of the lamination processor 33 that performs laminating processing. Therefore, the detection section can automatically acquire the image of the sheet before the laminating processing.

In the present embodiment, the second reading section 23 can be connected to the downstream side in the sheet conveyance direction of the image forming section 15 that is capable of forming an image on a sheet. Therefore, the detecting section can automatically acquire the image of the sheet after the image formation.

In the inspection apparatus 6 according to the present embodiment, the detecting section determines, based on the first read image, whether a defect in image formation on a sheet has occurred or a defect in laminating processing has occurred. Therefore, it is possible to automatically determine an image formation defect or a laminating processing defect.

In the inspection apparatus 6 according to the present embodiment, the detecting section determines, based on the first read image and the second read image, whether a defect in image formation on a sheet has occurred or a defect in laminating processing has occurred. Therefore, it is possible to automatically determine an image formation defect or a laminating processing defect.

The inspection apparatus 6 according to the present embodiment includes a notification section (controller 61) that notifies a user of a determination result obtained by the detecting section. Therefore, the user can easily recognize the occurrence of the image formation defect or the laminating processing defect.

In the inspection apparatus 6 according to the present embodiment, when the detecting section detects a defect in image formation on a sheet based on the second read image, the detecting section does not perform defect detection in the laminating processing. Therefore, in the case where the defect of the image formation is detected, the time for performing the defect detection of the laminating processing can be reduced.

In the inspection apparatus 6 of the present embodiment, the detecting section acquires the first read image from the line sensor included in the first reading section 43. Therefore, the first read image can be acquired easily.

In the present embodiment, the first reading section 43 detects reflected light emitted to the image surface of the sheet after the laminating processing. Therefore, it is possible to easily acquire the first read image obtained by reading the image surface of the sheet after the laminating processing.

In the present embodiment, the first reading section 43 emits light so as to obliquely hit the image surface of the sheet after the laminating processing. Further, the first reading section 43 receives light in an oblique direction with respect to the image surface of the sheet after the laminating processing. Therefore, in the case where a defect such as a wrinkle, a flaw, or an air bubble occurs in the laminate film of the laminated sheet, the defect can be accurately read.

The first and second embodiments of the present invention have been described above, but the description in the above embodiments is a preferred example of the inspection system according to the present invention, and the present invention is not limited to this.

For example, the image forming apparatus 1 may include a scanner and may form an image on a sheet based on image data read by the scanner.

For example, although the case where the detecting section of the present invention for detecting a defect in the laminating processing is the controller 61 of the inspection apparatus 6 has been described in the above embodiment, it is not limited thereto. For example, the controller 11 of the image forming apparatus 1 or the controller 41 of the first reading apparatus 4 may function as the detecting section of the present invention. The inspection system 100 may include a dedicated server or the like that functions as the detecting section of the present invention.

Although the image forming apparatus 1, the second reading apparatus 2, the laminating apparatus 3, the first reading apparatus 4, and the sheet ejection device 5 are separate devices in the above-described embodiment, these devices may be integrated with each other.

In the above-described embodiment, the light emitters 231 and 431 emit light so that the light obliquely strikes the upper surface of the sheet. The first light receivers 232 and 432 receive and detect the reflected light from the sheet, which is light in an oblique direction with respect to the upper surface of the sheet, but the present invention is not limited thereto. The light emitters 231 and 431 may emit light so that the light is vertically incident on the upper surface of the sheet. The light receivers 232 and 432 may receive and detect reflected light from the sheet, which is light in a direction perpendicular to the upper surface of the sheet.

In the above-described embodiment, the controller 61 serving as the detecting section detects a defect in the laminating processing on the basis of the first read image read by the first reading section, but the present invention is not limited thereto. The inspection system may include an ultrasonic sensor, a contact sensor, and the like for detecting a surface state of the sheet subjected to the laminating processing, and the detecting section may detect a defect in the laminating processing based on a detection result of the ultrasonic sensor, the contact sensor, and the like.

In the second embodiment described above, for example, in a case where it is difficult to distinguish between a white spot that is an image formation defect and an air bubble in a laminate film that is a laminating processing defect, or the like, the controller 61 may perform the following processing. In this case, in step S5*a* of the detection control processing, the controller 61 may notify the user that there is a difference between the image of the job and the first read image and may receive an identification result of the kind of defect by the user. In this case, the controller 61, which is a detecting section, may be caused to perform machine learning of the identification result of the kind of defect by the user.

Although an example in which an HDD or a semiconductor memory is used as a computer-readable medium for a program according to the present invention has been disclosed in the above description, the present invention is not limited to this example. As other computer-readable media, a nonvolatile memory such as a flash memory and a portable recording medium such as a CD-ROM can be applied. As a medium for providing the data of the program according to the present invention via a communication line, a carrier wave is also applied to the present invention.

In addition, the detailed configuration and detailed operation of the inspection system can be appropriately changed without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An inspection apparatus that is capable of inspecting a sheet comprising:

a hardware processor that acquires a first read image from a first reader that reads an image of the sheet that has been subjected to laminating processing performed by a lamination processor, the first reader being disposed on a downstream side of the lamination processor in a sheet conveyance direction, and detects a defect in the laminating processing in the sheet that has been laminated with a film by the laminating processing, based on the first read image, wherein the hardware processor acquires a second read image from a second reader that reads an image of the sheet before the laminating processing, and detects the defect in the laminating processing based on the first read image and the second read image.

2. The inspection apparatus according to claim 1, wherein the hardware processor acquires information of a surface condition of the sheet that has been subjected to the laminating processing, and detects the defect in the laminating processing based on the information.

3. The inspection apparatus according to claim 1, wherein the first reader is connectable to a downstream side of the lamination processor in the sheet conveyance direction.

4. The inspection apparatus according to claim 1, wherein the lamination processor is disposed on a downstream side of an image former in the sheet conveyance direction, the image former being capable of forming an image on the sheet, and the hardware processor detects the defect in the laminating processing in the sheet on which the image has been formed.

5. The inspection apparatus according to claim 4, wherein the lamination processor is connectable to a downstream side of the image former in the sheet conveyance direction.

6. The inspection apparatus according to claim 1, wherein the hardware processor detects, as the defect in the laminating processing, at least one of a wrinkle, a scratch, and an air bubble of the film with which the sheet has been laminated.

7. An inspection apparatus that is capable of inspecting a sheet comprising:

a hardware processor that acquires a first read image from a first reader that reads an image of the sheet that has been subjected to laminating processing performed by a lamination processor, the first reader being disposed on a downstream side of the lamination processor in a sheet conveyance direction, detects a defect in the laminating processing in the sheet that has been laminated with a film by the laminating processing, based on the first read image; and detects the defect in the laminating processing based on a shape and size of at least one of a wrinkle, a scratch, and an air bubble in the film that have been registered in advance.

8. The inspection apparatus according to claim 1, wherein the hardware processor detects the defect in the laminating processing based on an original image to be formed on the sheet before the laminating processing and the first read image.

9. The inspection apparatus according to claim 8, wherein the hardware processor detects a defect in the laminating processing by subtracting the original image from the first read image.

10. The inspection apparatus according to claim 1, wherein the hardware processor acquires the second read image from the second reader that is connectable to an upstream side of a lamination processor in a sheet conveyance direction, the lamination processor performing the laminating processing.

11. The inspection apparatus according to claim 10, wherein the second reader is connectable to a downstream side of an image former in the sheet conveyance direction, the image former being capable of forming an image on the sheet.

12. The inspection apparatus according to claim 11, wherein the hardware processor determines, based on the first read image, whether a defect in the sheet has occurred in formation of the image or in the laminating processing.

13. The inspection apparatus according to claim 11, wherein the hardware processor determines, based on the first read image and the second read image, whether a defect in the sheet has occurred in formation of the image or in the laminating processing.

14. The inspection apparatus according to claim 12, wherein the hardware processor notifies a user of a determination result.

15. The inspection apparatus according to claim 11, wherein, upon detection of a defect in the sheet in formation of the image based on the second read image, the hardware processor does not detect a defect in the laminating processing.

16. The inspection apparatus according to claim 1, wherein the hardware processor acquires the first read image from a line sensor included in the first reader.

17. The inspection apparatus according to claim 1, wherein the first reader detects reflection light emitted to the image on a surface of the sheet that has been subjected to the laminating processing.

18. The inspection apparatus according to claim 17, wherein the first reader emits light that obliquely hit the image on the surface of the sheet that has been subjected to the laminating processing.

19. The inspection apparatus according to claim 17, wherein the first reader receives light that is in an oblique direction with respect to the surface with the image of the sheet that has been subjected to the laminating processing.

20. A non-transitory recording medium storing a computer readable program causing a computer of an inspection apparatus that is capable of inspecting a sheet to function as:

a hardware processor that acquires a first read image from a first reader that reads an image of the sheet that has been subjected to laminating processing performed by a lamination processor, the first reader being disposed on a downstream side of the lamination processor in a sheet conveyance direction, and detects a defect in the laminating processing in the sheet that has been laminated with a film by the laminating processing, based on the first read image, wherein the hardware processor acquires a second read image from a second reader that reads an image of the sheet before the laminating processing, and detects the defect in the laminating processing based on the first read image and the second read image.

21. An inspection system that is capable of inspecting a sheet, comprising:

a lamination processor that performs laminating processing in which a sheet is laminated with a film;

a first reader that reads an image of the sheet that has been subjected to laminating processing performed by a lamination processor, the first reader being disposed on a downstream side of the lamination processor in a sheet conveyance direction; and a hardware processor that acquires a first read image from a first reader and that detects a defect in the laminating processing in the sheet that has been subjected to the lamination processing by the lamination processor, based on the first read image, wherein the hardware processor acquires a second read image from a second reader that reads an image of the sheet before the laminating processing, and detects the defect in the laminating processing based on the first read image and the second read image.

22. The inspection system according to claim 21, further comprising: an image former on an upstream side of the lamination processor in a sheet conveyance direction, the image former being capable of forming an image on the sheet.

* * * * *